Nov. 7, 1939.   C. J. HUDSON   2,178,835
GRINDING WHEEL
Filed June 19, 1937
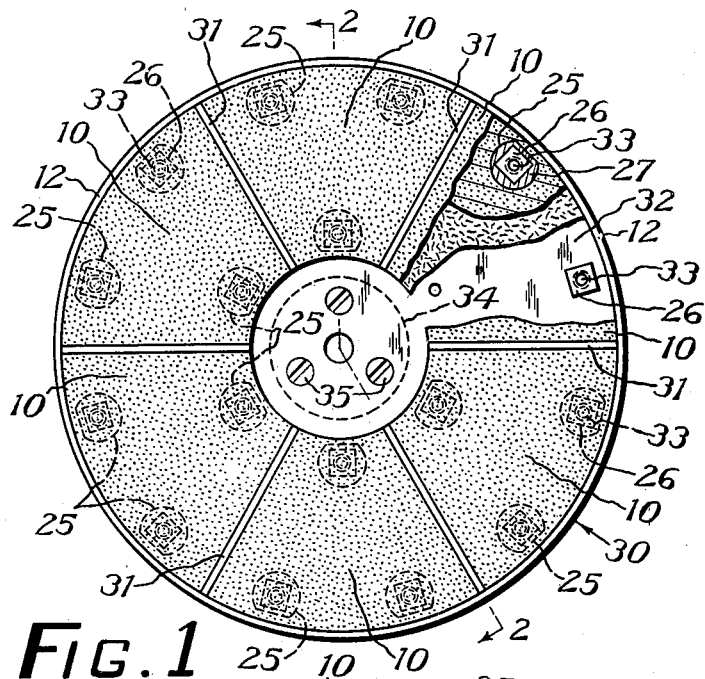
FIG. 1
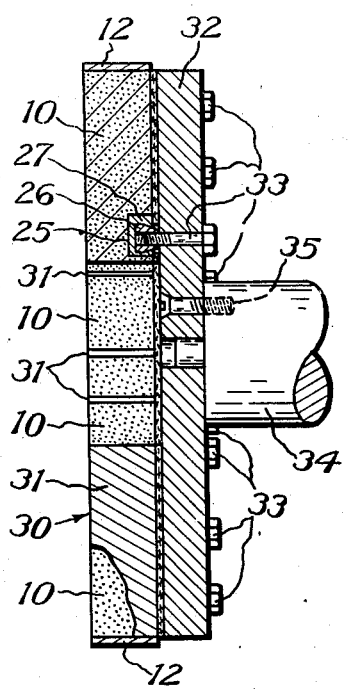
FIG. 2
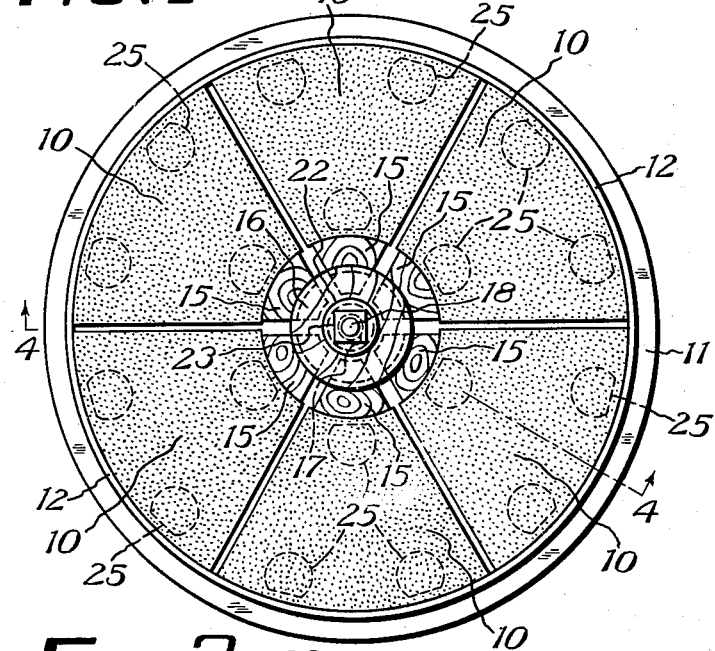
FIG. 3
FIG. 4
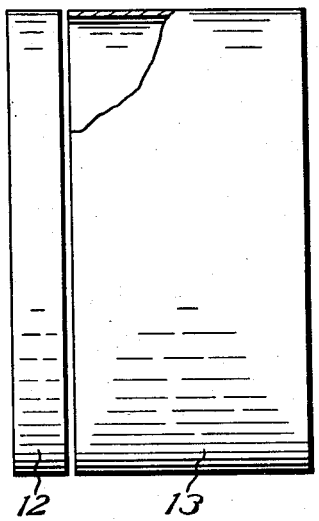
FIG. 5
INVENTOR
CHARLES J. HUDSON
BY
George Crompton
ATTORNEY Patented Nov. 7, 1939

2,178,835

UNITED STATES PATENT OFFICE 2,178,835

GRINDING WHEEL

Charles J. Hudson, West Boylston, Mass., assignor to Norton Company, Worcester, Mass., a corporation of Massachusetts Application June 19, 1937, Serial No. 149,121

2 Claims. (Cl. 51—209)

The invention relates to grinding wheels, particularly to wheels made from a plurality of sectors.

One object of the invention is to provide a thoroughly safe means and method of reinforcing a wheel of the type indicated. Another object of the invention is to provide an extremely strong composite wheel structure for face grinding. Another object of the invention is to provide a simple and efficacious method for making the wheels of the type indicated. Other objects will be in part obvious or in part pointed out hereinafter.

The invention accordingly consists in the features of construction, combinations of elements, and arrangements of parts, and in the several steps and relation and order of each of said steps to one or more of the others thereof, all as will be illustratively described herein, and the scope of the application of which will be indicated in the following claims.

In the accompanying drawing which illustrates one of many possible embodiments of the mechanical features of this invention, Figure 1 is a front elevation of a grinding wheel constructed according to this invention, Figure 2 is a radial sectional view, taken on the line 2—2 of Figure 1, Figure 3 is a plan view showing the method of constructing the wheel, Figure 4 is a sectional view, taken on the line 4—4 of Figure 3, Figure 5 is a view on a reduced scale illustrating a quantity of the material for the reinforcing band.

Referring first to Figure 4, I provide a plurality of sectors 10 of abrasive material, for example of silicon carbide or aluminum oxide bonded with any desired bond, for example vitrified clay bond, silicate bond, resinoid or natural resin or rubber bond. I place these sectors 10 on a steel plate 11 to form a circular disk of abrasive, as shown in Figure 3. One by one to each radial edge of each sector I apply, as by means of a trowel or the like, a spread of litharge. After each individual sector 10 has its two radial edges coated with litharge, I place it in the appropriate position to make the composite wheel, as shown in Figure 3.

I provide a reinforcing circumferential band 12 which I place outside of the assembly of sectors, as shown in Figures 3 and 4. This band 12 may be cut from a large tube 13, as shown in Figure 5. I prefer that the band 12 shall be of relatively soft material and yet of high tensile strength. I have found that if heavy paper impregnated with liquid synthetic resin, for example liquid phenol formaldehyde, is wound upon a drum under tension and then cured with a heat and for a length of time ordinarily used to cure phenol-formaldehyde resins, there is produced a tube 13 from which may be cut bands 12 having great tensile strength, and sufficient elasticity and resiliency for making the wheel according to the present invention, and yet which will wear away during a grinding operation or pursuant to truing or dressing of the grinding wheel so that there is never any detrimental amount of the band 12 projecting over the side face of the wheel.

The band 12 is of such diameter as compared with that of the sectors 10 that it will just fit over them when they have been assembled in the relationship shown in Figure 3. On the other hand, the individual sectors 10 may be placed inside of the band. I now place a plurality of small wooden sectors 15 in the central hole of the wheel being manufactured. Each wooden sector 15 has an interior conical surface on the inside face. I place a wooden cone 16 in contact with the inner faces of all the sectors 15. The wooden cone 16 has a central axial bore 17 through which extends a bolt 18. I provide a cup 19 having a central hole for the bolt 18. I provide a washer 20 adjacent the head 21 of the bolt 18 to prevent the bolt from passing through the hole in the cup 19. The plate 11 has a hole to receive the small end of the cone 16 and also the bolt 18, all as shown in Figure 4. I now place a washer 22 around the other end of the bolt 18 and place a nut 23 on the threaded end of the bolt. I now tighten the nut 23, which forces the cone 16 downwardly, thus spreading the wooden sector blocks 15, and thereby forcing outwardly the several abrasive sectors 10. All this is done before the litharge has a chance to set. The litharge is then allowed to set and thereafter the bolt 18, cone 16 and wooden sector blocks 15 are removed. The wheel is now complete and is ready for mounting. It will be noted that the band 12 is under tension so that centrifugal force tending to drive the sectors 10 apart is to a large extent overcome by the centripetal action of the annular band 12.

Either during the manufacture of the sectors 10 or thereafter, a plurality of depressions 25 are formed in one face thereof. At any stage in the manufacturing operation, conical nuts 26 are imbedded in the depressions 25 by means of Babbitt metal 27. The complete wheel 30 is shown in Figure 1 and consists of a plurality, for example six, sectors 10 cemented together with litharge joints 31 and surrounded by a paper resinoid ring 12 under tension. This wheel 30 may be mounted upon a face plate 32 by means of bolts 33 which extend through the face plate 32 and into nuts 26. The face plate 32 is mounted upon a spindle 34 in any suitable manner, as by means of screws 35.

In the use of the wheel 30, the exposed face is used to grind. As the wheel wears, it becomes thinner, and may be trued from time to time with any suitable dressing instrumentality which will readily cut the resinoid paper ring or band 12. A particular feature of the ring or band 12 is that under no circumstances can it injure any one. Composite wheels made with wire windings have been used and the wire winding has been a potential source of danger in case of breakage.

With the ring 12 under considerable tension due to the manner of manufacturing the wheel described, the centrifugal force tending to cause the sectors 10 to fly outwardly is to some extent balanced, thus relieving the bolts 33 of a part of the centrifugal load and also relieving the litharge joints 31 of the same. Since the joints 31, the bolts 33 and the ring 12 all unite to hold the sectors from flying apart, the wheel made according to the invention has a high factor of safety. Furthermore, there are no projecting corners or parts to the ring 12 likely to catch anything and cause breakage.

It should be understood that other cements may be used besides litharge, for example lavasul, which is substantially sulphur with a small percentage of carbon, and many other types. Also, other substances besides babbit may be used to imbed the nuts 26, for example lavasul or plain sulphur. Also, babbit might be used between the sectors. Instead of using a ring or band 12 made of paper impregnated with resinoid, a band made of resinoid impregnated cloth might be used. Instead of resinoid, i. e. synthetic resin, rubber might be substituted.

It will thus be seen that there has been provided by this invention a method and an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. Article of the class described comprising a plurality of bonded abrasive uni-diameter sectors, cement securing said sectors together in the form of a wheel, and a peripheral band outside of said sectors and in a state of tension exerting a compressive force against them and comprising paper impregnated with resinoid, the article constituting a grinding disk, the plane face of which does the grinding and the peripheral band wearing away as the disk is used.

2. Article of the class described comprising a plurality of bonded abrasive uni-diameter sectors, cement securing said sectors together in the form of a wheel, and a peripheral band outside of said sectors and in a state of tension exerting a compressive force against them and comprising impregnated sheet material wound in a plurality of layers and cured, the article constituting a grinding disk, the plane face of which does the grinding and the peripheral band wearing away as the disk is used.

CHARLES J. HUDSON.